United States Patent
Ahlstrom et al.

(10) Patent No.: US 11,550,862 B2
(45) Date of Patent: Jan. 10, 2023

(54) RECOMMENDATION SYSTEM FOR PROVIDING PERSONALIZED AND MIXED CONTENT ON A USER INTERFACE BASED ON CONTENT AND USER SIMILARITY

(71) Applicant: TD Ameritrade IP Company, Inc., Omaha, NE (US)

(72) Inventors: Logan Sommers Ahlstrom, Ann Arbor, MI (US); Ravindra Reddy Tappeta Venkata, Novi, MI (US); Sean Ming-Yin Law, Ann Arbor, MI (US); Joseph Clark Walston, Herriman, UT (US); Raviteja Lokineni, Ann Arbor, MI (US); Dayanand Narregudem, Ann Arbor, MI (US)

(73) Assignee: TD Ameritrade IP Company, Inc., Omaha, NE (US)

(*) Notice: Subject to any disclaimer, the term of this patent is extended or adjusted under 35 U.S.C. 154(b) by 218 days.

(21) Appl. No.: 17/121,370

(22) Filed: Dec. 14, 2020

(65) Prior Publication Data
US 2021/0097122 A1    Apr. 1, 2021

Related U.S. Application Data

(63) Continuation of application No. 16/371,063, filed on Mar. 31, 2019, now Pat. No. 10,867,000.

(51) Int. Cl.
*G06F 16/9535* (2019.01)
*G06F 16/955* (2019.01)
(Continued)

(52) U.S. Cl.
CPC .... *G06F 16/9535* (2019.01); *G06F 16/24578* (2019.01); *G06F 16/285* (2019.01);
(Continued)

(58) Field of Classification Search
CPC .. G06F 16/9535; G06F 16/955; G06F 16/951; G06F 16/9538; G06F 16/285; G06F 16/24578; G06F 9/451; G06F 3/0482
(Continued)

(56) References Cited

U.S. PATENT DOCUMENTS

| | | |
|---|---|---|
| 6,266,649 B1 | 7/2001 | Linden et al. |
| 6,438,579 B1 | 8/2002 | Hosken |

(Continued)

OTHER PUBLICATIONS

Ko, Han-Gyu, et al., "Semantically-based Recommendation by using Semantic Clusters of Users' Viewing History", BigComp 2014, Bangkok, Thailand, Jan. 15-17, 2014, pp. 83-87.*

(Continued)

*Primary Examiner* — Robert Stevens
(74) *Attorney, Agent, or Firm* — Harness, Dickey & Pierce P.L.C.

(57) ABSTRACT

A recommendation system includes a content similarity analyzer configured to determine a first set of content item identifiers similar to a set of viewed content items based on respective similarity scores and add them to a first list. A similar user content extraction module identifies a set of similar user identifiers from a user similarity database; obtains, based on respective viewing histories of the set, a second set of content item identifiers; and adds them to the first list. The recommendation system includes a content filter configured to select a subset of content item identifiers from the first list based on the corresponding similarity scores between content item identifiers of the first list and a viewing history. The content filter is configured to transmit the subset of content item identifiers for display of the corresponding content items via a web portal on a user interface of a first user device.

20 Claims, 8 Drawing Sheets

(51) Int. Cl.
*G06F 16/951* (2019.01)
*G06F 16/9538* (2019.01)
*G06F 16/28* (2019.01)
*G06F 16/2457* (2019.01)
*G06F 9/451* (2018.01)
*G06F 3/0482* (2013.01)

(52) U.S. Cl.
CPC .......... *G06F 16/951* (2019.01); *G06F 16/955* (2019.01); *G06F 16/9538* (2019.01); *G06F 3/0482* (2013.01); *G06F 9/451* (2018.02)

(58) Field of Classification Search
USPC ....................................................... 707/727
See application file for complete search history.

(56) References Cited

U.S. PATENT DOCUMENTS

| | | | |
|---|---|---|---|
| 7,113,917 B2* | 9/2006 | Jacobi | G06Q 30/0282 705/14.67 |
| 8,868,596 B2* | 10/2014 | Zelevinsky | G06Q 30/0631 707/769 |
| 9,569,499 B2 | 2/2017 | Kami | |
| 9,785,954 B2 | 10/2017 | Wu et al. | |
| 9,792,285 B2 | 10/2017 | Reiley et al. | |
| 9,965,129 B2 | 5/2018 | Reiley et al. | |
| 10,311,386 B2* | 6/2019 | Gomez Uribe | G06Q 30/0201 |
| 10,349,137 B2 | 7/2019 | Kim | |
| 2005/0102202 A1 | 5/2005 | Linden et al. | |
| 2009/0083796 A1 | 3/2009 | Karasudani et al. | |
| 2010/0070507 A1 | 3/2010 | Mori | |
| 2013/0290110 A1* | 10/2013 | LuVogt | G06Q 30/02 705/14.66 |
| 2016/0154887 A1 | 6/2016 | Zhao | |
| 2016/0371274 A1* | 12/2016 | Ng | G06F 16/24573 |
| 2017/0161618 A1 | 6/2017 | Swaminathan et al. | |
| 2018/0189293 A1* | 7/2018 | Zhao | G06F 16/4387 |
| 2018/0253173 A1 | 9/2018 | Reiley et al. | |

OTHER PUBLICATIONS

Pappas, Nikolaos, et al., "Combining content with user preferences for nonfiction multimedia recommendation: a study on TED lectures", Multimedia Tools and Applications, vol. 74, Springer Science+ Business Media, New York, NY, Mar. 6, 2014, pp. 1175-1197.

Seko, Shunichi, et al., "Group Recommendation using Feature Space Representing Behavioral Tendency and Power Balance among Members", RecSys 11, Chicago, IL, Oct. 23-27, 2011, pp. 101-108.

* cited by examiner

RECOMMENDATION SYSTEM FOR PROVIDING PERSONALIZED AND MIXED CONTENT ON A USER INTERFACE BASED ON CONTENT AND USER SIMILARITY

CROSS-REFERENCE TO RELATED APPLICATIONS

This application is a continuation of U.S. patent application Ser. No. 16/371,063 (now U.S. Pat. No. 10,867,000) filed Mar. 31, 2019. The entire disclosure of the application referenced above is incorporated by reference.

FIELD

The present disclosure relates to user interfaces and more particularly to systems and methods for generating content item recommendations.

BACKGROUND

Content recommendation provides a unique challenge, especially when a large amount and different types of content must be organized and recommended to a large number of users. Additional challenges are presented when the user does not have a content viewing history from which to develop recommendations, presenting a problem when attempting to offer content to a new user that is likely to be relevant to their interests.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A content recommendation system includes at least one processor and a memory coupled to the at least one processor. The memory stores a plurality of content item identifiers corresponding to a plurality of stored content items, a viewing history index including, for each user of a plurality of users and a viewing history indicating content items the user has viewed. The memory also stores a content similarity index including a similarity score indicating a similarity between content items of the plurality of stored content items and a user similarity index identifying, for each user of the plurality of users, a set of similar users. The memory also stores instructions that, upon execution, cause the at least one processor to obtain a first viewing history of a first user from the viewing history index and determine, based on the user similarity index, a first set of users similar to the first user.

The instructions further cause the processor to obtain a corresponding viewing history from the viewing history index for each user in the first set of users and select a set of similar content item identifiers from the plurality of content item identifiers based on similarity scores stored in the content similarity index between the content items in the first viewing history and the plurality of stored content items. The instructions also cause the processor to update a first recommendation list with (i) the corresponding viewing history from the viewing history index for each similar user in the first set of users and (ii) the set of similar content item identifiers. The instructions further cause the processor to select a subset of recommended content item identifiers from the first recommendation list based on a weighted similarity score and transmit each identifier included in the subset of recommended content item identifiers to a user device of the first user for display of a corresponding user-selectable link for each identifier on a screen of the user device.

In other features, the memory stores, for each content item of the plurality of stored content items, a profile. In other features, the instructions, upon execution, cause the at least one processor to, in response to a new content item, generate a first profile for the new content item, calculate a corresponding similarity score between the new content item and the plurality of stored content items, and add the corresponding similarity scores to the content similarity index. In other features, the first profile for the new content item is based on a predetermined list of terms. In other features, the instructions, upon execution, cause the at least one processor to classify the first user into a first group of a set of groups based on first user parameters and select a predetermined number of members of the first group as the set of similar users.

In other features, the instructions, upon execution, cause the at least one processor to determine a distance value for each member of the first group indicating how similar the first user is to each member of the first group. In other features, the instructions, upon execution, cause the at least one processor to select the predetermined number of members of the first group as the set of similar users based on a respective distance value for each of the selected predetermined number of members.

In other features, the user similarity index for the first user is updated in response to: (i) a predetermined interval having elapsed and (ii) a change to a first profile corresponding to the first user. In other features, the memory stores a user parameter database including, for each user, user parameters including (i) portfolio structure, (ii) trading activity, (iii) platform usage, and (iv) demographic information. In other features, the selected set of similar content item identifiers have similarity scores above a predetermined threshold.

In other features, the weighted similarity score for content items in the subset of recommended content item identifiers indicates how similar the content items are to at least one of: (i) the content items of the first viewing history and (ii) content items of the corresponding viewing history of a similar user in the first set of users. In other features, the instructions, upon execution, cause the at least one processor to determine the weighted similarity score for each entry of the first recommendation list based on the first viewing history and select a predetermined number of content items from the first recommendation list based on the weighted similarity score as the subset of recommended content item identifiers.

In other features, the instructions, upon execution, cause the at least one processor to identify entries common to the first viewing history of the first user and the first recommendation list and remove the identified entries prior to selecting the subset of recommended content item identifiers. In other features, the instructions, upon execution, cause the at least one processor to obtain a respective recommendation list for each similar user in the first set of users and update the first recommendation list with each obtained respective recommendation list. In other features, the plurality of stored content items include at least one of: (i) a video, (ii) an article, (iii) a playlist, and (iv) an online course.

A content recommendation method includes obtaining a first viewing history of a first user from a viewing history index. The viewing history index includes, for each user of a plurality of users, a viewing history indicating content items the user has viewed. The method further includes determining, based on a user similarity index, a first set of users similar to the first user. The user similarity index identifies, for each user of the plurality of users, a set of similar users. The method also includes obtaining a corresponding viewing history from the viewing history index for each user in the first set of users.

The method further includes selecting a set of similar content item identifiers from a plurality of content item identifiers based on similarity scores stored in a content similarity index between the content items in the first viewing history and the plurality of stored content items. The content similarity index includes a similarity score indicating a similarity between content items of the plurality of stored content items. The plurality of content item identifiers correspond to a plurality of stored content items. The method also includes updating a first recommendation list with (i) the corresponding viewing history from the viewing history index for each similar user in the first set of users and (ii) the set of similar content item identifiers. The method further includes selecting a subset of recommended content item identifiers from the first recommendation list based on a weighted similarity score. The method also includes transmitting each identifier included in the subset of recommended content item identifiers to a user device of the first user for display of a corresponding user-selectable link for each identifier on a screen of the user device.

In other features, the method includes generating a first profile for the new content item. For each content item of the plurality of stored content items, a profile is stored. In other features, the method includes calculating, based on a predetermined list of terms, a corresponding similarity score between the new content item and the plurality of stored content items and adding the corresponding similarity scores to the content similarity index. In other features, the method includes classifying the first user into a first group of a set of groups based on first user parameters and selecting a predetermined number of members of the first group as the set of similar users.

In other features, the method includes determining a distance value for each member of the first group indicating how similar the first user is to each member of the first group. In other features, the method includes selecting the predetermined number of members of the first group as the set of similar users based on a respective distance value for each of the selected predetermined number of members. In other features, the method includes determining the weighted similarity score for each entry of the first recommendation list based on the first viewing history and selecting a predetermined number of content items from the first recommendation list based on the weighted similarity score as the subset of recommended content item identifiers.

In other features, the method includes identifying entries common to the first viewing history of the first user and the first recommendation list and removing the identified entries prior to selecting the subset of recommended content item identifiers. In other features, the method includes obtaining a respective recommendation list for each similar user in the first set of users and updating the first recommendation list with each obtained respective recommendation list.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
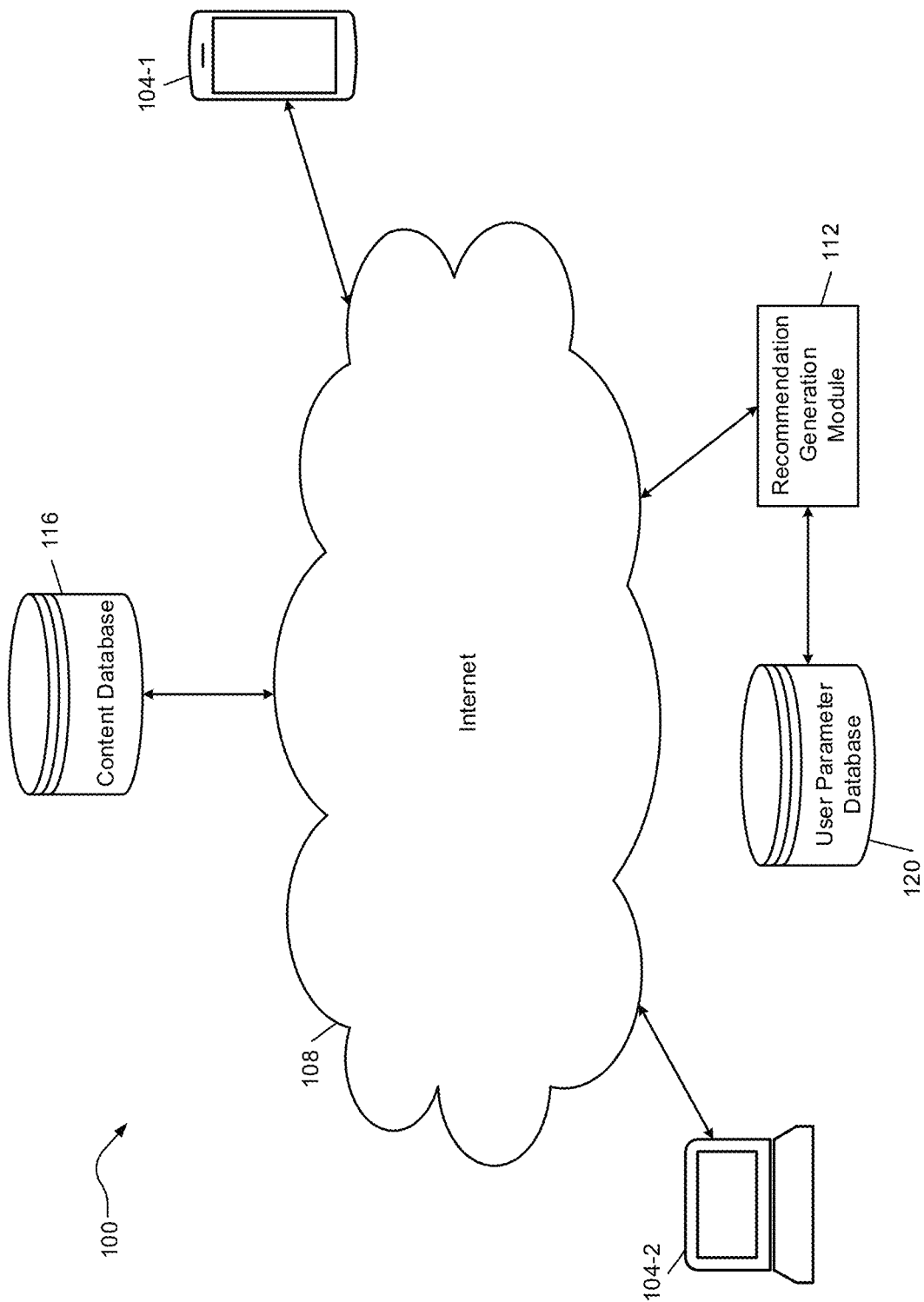
FIG. 1 is a high-level block diagram of an example network communication system including a content recommendation system according to the principles of the present disclosure.

A content recommendation system provides a user with relevant content items based on the user's viewing history and the viewing history of other users that are identified as similar to the user. Providing each user with personalized content recommendations for viewing or reading encourages relevant learning as well as interaction with the content platform, improving user experience.

For example, each user may have a personalized account through which certain content, such as educational content, may be suggested to the user or automatically displayed based on what that user has already viewed as well as what users similar to the present user have viewed. Once a particular user is logged into their personalized account, their viewing history can be monitored and articles or videos reviewed positively or "liked" by the user can also be monitored. Once the user has a viewing history, the content recommendation system can compare what the user has already viewed to existing content items.

A user's viewing history may reflect the user's interaction with content items: viewed by the user, liked by the user, entirely viewed by the user, prematurely ended by the user, shared by the user, etc. Viewing the entire content item (such as watching an entire video, scrolling to the end of an article, or dwelling on an image for a predetermined period of time) may be interpreted as a positive indicator for the content item with respect to the user. Meanwhile, cutting the content item short or giving the content item a poor rating may omit the content item from the user's viewing history for purposes of recommendation to similar users, or may even negatively impact a recommendation of that item from another user's viewing history.

In various implementations, each content item currently indexed in a database is compared to each content item in a user's viewing history. During the comparison, a similarity score is calculated indicating how similar a first content item is to a second content item. For context, if the user has read a particular article, each existing content item is compared to the particular article and a similarity score is generated for each existing content item in comparison to the particular article. A lookup table may be indexed by content item and may contain similarity scores for every other content item stored in the database.

Content items are not limited to a single type of content, even if the user's viewing history includes a single type of content, and content item comparison is not limited by content type. For example, videos may be compared to articles to determine a similarity score by using closed captioning data of each video. A list of salient terms may be used to analyze each content item in order to calculate how similar one content item is to another content item. Using closed captioning of videos provides the content recommendation system with the ability to recommend different types of content items to users. Other forms of content include articles, webcasts, and live broadcasts.

In various implementations, the content recommendation system also compares each user to other users that have a viewing history of content items. Therefore, even if the particular user has never viewed any content items, the content recommendation system is still able to provide relevant recommendations to the particular user based on content items other similar users have viewed, reducing or eliminating "cold start" issues.

To identify similar users, when a new user account has been created, user parameters, such as portfolio structure, trading activity, platform usage, and demographic information, are analyzed and compared to other users. In various implementations, similar users for each user are updated at predetermined intervals, such as every week, to ensure updated or changed user parameters are incorporated. Further, similar users of the particular user may be updated in response to a significant change in the particular user's parameters, such as a significant increase or decrease in trading, a significant increase or decrease in an account total, a change in personal status (marriage or children), etc.

To identify similar users, the content recommendation system first categorizes the particular user into a group based on features (the parameters) of the user. The content recommendation system has recognized a set of groups of generally similar users based on the user parameters described above. In various implementations, the content recommendation system may use unsupervised learning, such as K-means clustering, to cluster users with a viewing history into the set of groups. In various implementations, lower or upper limits on the number of clusters may be set. These limits may be adaptive based on, for example, the total number of users. Additionally or alternatively, the number of clusters may be determined based on upper and/or lower limits placed on how many users can be in each cluster.

In various implementations, a machine learning algorithm may be trained to define a set of groups and classify the users into the groups. Once the user is classified into a particular group, the content recommendation system identifies which group members are most similar to the particular user. In various implementations, all of the other group members are considered to be sufficiently similar to the particular user.

In other implementations, similarity amongst users may be determined based on an optimized distance metric capable of scaling to tens of millions of users. For example, the distance metric may be determined for each pair of users as a z-normalized Euclidean distance between the feature vectors of the pair of users. As another example, the distance metric may be determined based on a machine learning algorithm. The content recommendation system may select a predetermined number or percentage of users having the lowest distance metrics to the particular user.

Once similar users are identified, the content recommendation system can obtain the viewing history and recommendations for the similar users. The content recommendation system can combine the identified similar content items as well as content items viewed by and recommended to similar users into a recommendation list. Content items on the recommendation list are selected and user-selectable links are displayed on, for example, a home screen of the particular user's personalized account, linking the particular user to the respective content item upon selection of the user-selectable link. The user-selectable links to the selected content items provide the particular user with content items that are inferred to be most relevant to the particular user. In various implementations, the content recommendation system may filter out what the particular user has already viewed to prevent recommending content items the particular user has previously viewed. Further, the content recommendation system may only select content that has been approved from the particular user's jurisdiction, for example, only selecting content approved in the U.S., Hong Kong, Singapore, or where the particular user is presently located.

A similarity index may be used to identify which content items should be recommended to the particular user. The similarity index may represent a comparison of each content item included in a recommendation list (as described above, the recommendation list would include the identified similar content and content items viewed by and recommended to the identified similar users) to the particular user's viewing history to determine how similar each content item in the recommendation list is to those content items that the particular user has already viewed. In this way, content items that are too similar to previously viewed content may be filtered out from the recommendation list. For example, when selecting a set of recommended content items from the recommendation list, the content recommendation system may filter out those content items with too high of a similarity to already viewed content items as well as those with too low of a similarity.

An additional consideration to ensure relevancy is how recently a content item was viewed. For example, only content items that were viewed within a predetermined period—such as the last six months—are considered. In various implementations, instead of removing content items based on how recently each content item was viewed, the similarity index may be weighted (for example, linearly or exponentially) in time to more heavily weigh those content items that have been more recently viewed.

Once the set of recommended content items is identified, the content recommendation system may generate user-selectable links and instruct the display of those user selectable links on a home screen of the particular user's account. The content recommendation system may identify a new set of recommended content items to recommend each time the particular user logs into their account.

FIG. 1 is a high-level example block diagram of a network communication system 100 including a content recommendation system according to principles of the present disclosure. A first user device 104-1 and a second user device 104-2 may be used to access a particular user's account via the Internet 108. In various implementations, the second user device 104-2 may interact directly with a recommendation generation module 112 using an internal network connection. The recommendation generation module 112 can access a content database 116 via the Internet 108 or via the internal network connection as well as a user parameter database 120 via the internal network connection to generate content item recommendations on a home screen when the particular user is logged-on to their account via a web portal. The user parameter database 120 stores information for each registered user account. In various implementations, the content database 116 includes approved educational content that may be recommended to users in accordance with regulatory guidelines.

The stored information for each user may include portfolio structure, trading activity, platform usage, and demographic information. Portfolio structure parameters may include: an account type (such as an individual account, retirement account, guided investing account, share of wallet, etc.) and asset allocation (such as a percentage of mutual funds, a percentage of equity, a percentage of exchange traded funds, a percentage of fixed income, a percentage of cash, etc.). Trading activity parameters may include: a total number of trades, margin approval, options approval, an investor movement index, a number of positions, and options strategy (such as a number of short calls over the last 90 days, a number of long calls over the last 90 days, a number of short puts over the last 90 days, a number of long puts over the last 90 days, a total number of short calls, a total number of long calls, a total number of short puts, a total number of long puts, etc.).

Platform usage parameters may include: retail website usage frequency, Thinkorswim trading platform usage frequency, mobile application usage frequency, etc. Demographic information may include: age, client tenure, dependent status, number of dependents, marital status, employment history, etc.

Figure 2:
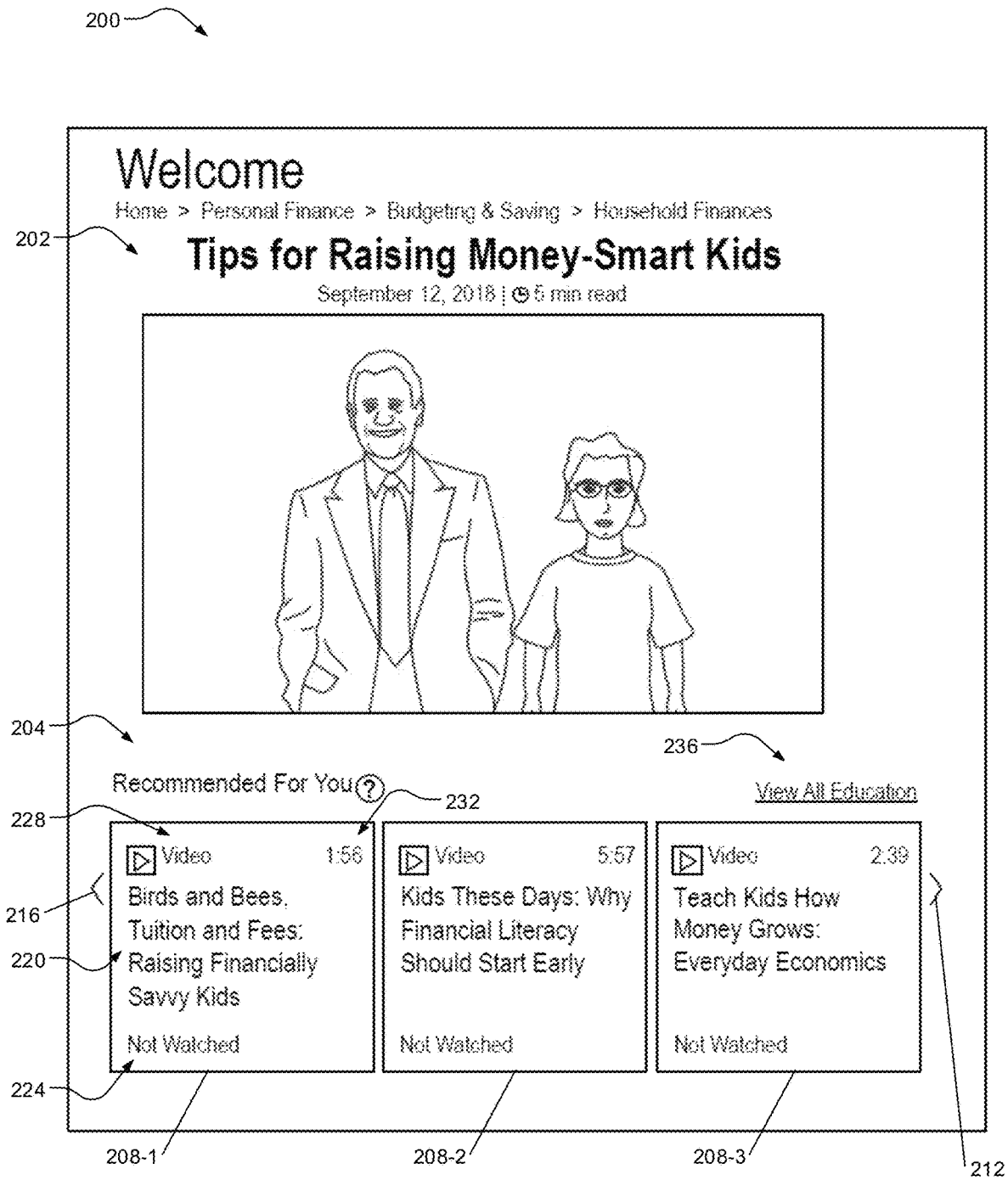
FIG. 2 is an example user interface displaying content item recommendations.

FIG. 2 is a representation of an example user interface displaying content item recommendations according to the principles of the present disclosure. The example user interface depicts a home screen 200 after the particular user has logged-in to their personalized account. Upon logging-in, a selected article 202 or other content item is displayed for suggested viewing. The selected article 202 may be a headline article or other news story unrelated to recommended content items.

Each user's personalized account grants the particular user access to their portfolio and offers trading options as well as other portfolio management methods. Each personalized account also recommends particular content items to the particular user based on their viewing history and the viewing history of similar users. In various implementations, a scroll area 204 is displayed on the home screen 200 that displays thumbnails including links to content items that are recommended for the particular user. For example, the content items being recommended may be educational content that provides information relevant to the host, such as, a brokerage firm, of the personalized account.

The scroll area 204 may recommend in thumbnails: a first content item 208-1, a second content item 208-2, and a third content item 208-3. On either end of the scroll area 204, the particular user may select a right scroll interface item 212 and a left scroll interface item 216 to scroll through additional content item recommendations. Each recommended content item, such as the first content item 208-1, may include a content item title 220, a previously viewed indication 224, content type 228, and, in the case of a video, a runtime 232. For example, in a case where recommended content items can include previously viewed content items, the previously viewed indication 224 may switch from "Not Watched" as shown in FIG. 2 to "Watched." An educational content items link 236 is also displayed on the home screen 200, linking the particular user to view content items available to them.

Figure 3:
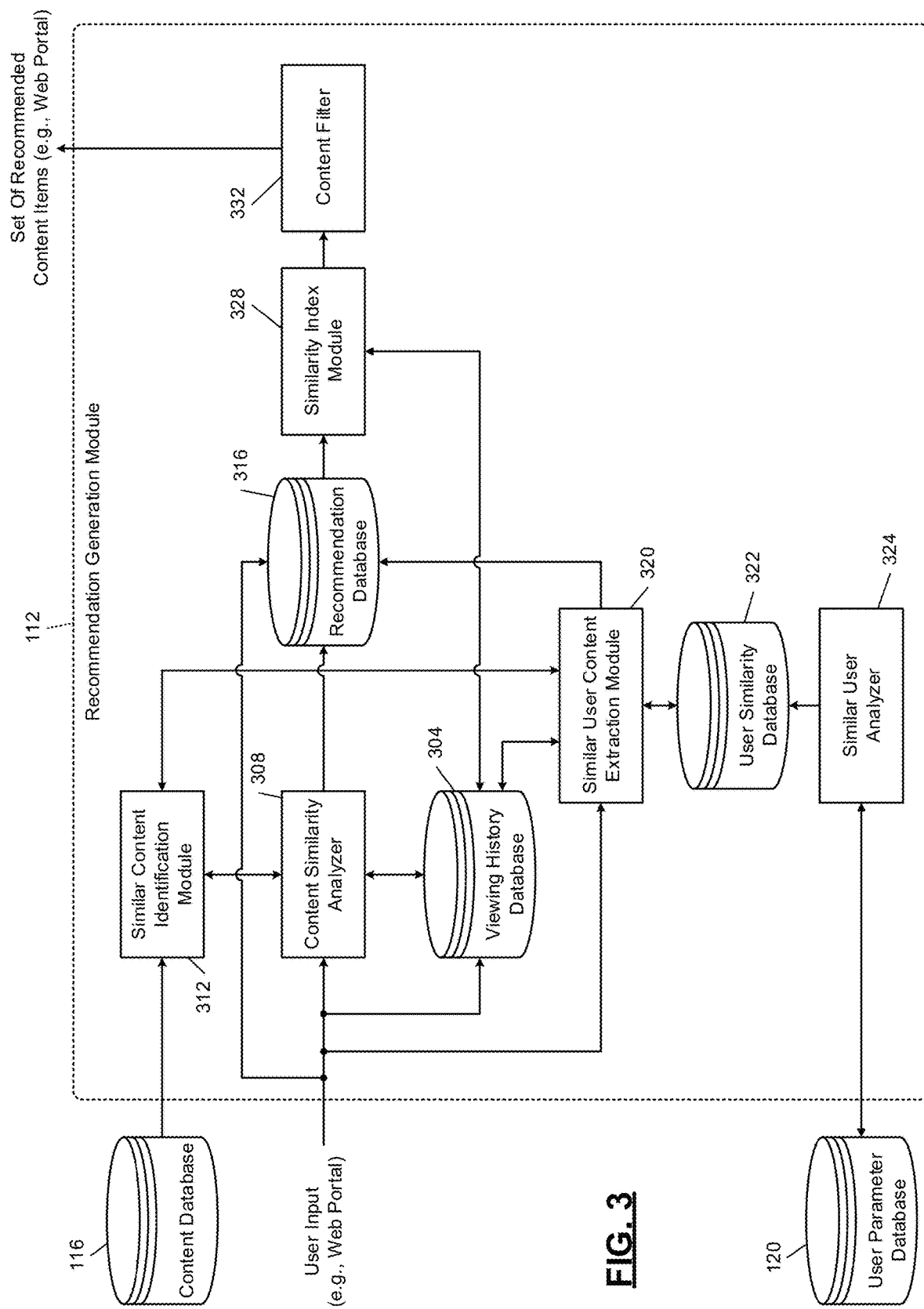
FIG. 3 is a functional block diagram of an example recommendation generation module.

FIG. 3 is a functional block diagram of an example content recommendation system according to principles of the present disclosure. As described with respect to FIG. 1, the recommendation generation module 112 retrieves content items from the content database 116 and user parameters from the user parameter database 120. The recommendation generation module 112 generates user-selectable links for display on the home screen of the logged-on user's account, via a web portal on a user device, in response to the particular user logging-in to their personalized account. The user input from the web portal may be the particular user logging-in, the user selecting a content item, or the user liking a content item.

When the user views a content item, a viewing history database 304 stores an indication that the particular user viewed the content item. In various implementations, the viewing history database 304 is separate from the recommendation generation module 112 and separately monitors viewed content items of each user. In various implementations, as shown in FIG. 3, the recommendation generation module 112 may include the viewing history database 304.

Upon the particular user logging into their personalized account, a content similarity analyzer 308 receives an indication that the particular user has logged on. The content similarity analyzer 308 obtains the viewing history of the particular user from the viewing history database 304. The content similarity analyzer 308 also retrieves indexed similarity scores from a similar content identification module 312. The similar content identification module 312 compares each new content item when the new content item is loaded into the content database 116 to existing content items. This comparison results in a similarity score being stored for each content item indicating how similar each content item is to the new content item.

As mentioned previously, the recommendation generation module 112 is able to compare different content types to one another. That is, videos, articles, webcasts, and live broadcasts are compared to one another and the similar content identification module 312 determines the similarity between the different types of content. The content similarity analyzer 308 retrieves the similarity scores for each content item in the viewing history of the particular user as compared to existing content items. After receiving the similarity scores, the content similarity analyzer 308 selects only the content items with a similarity score above a predetermined threshold. The content similarity analyzer 308 then sends identifiers of the content items with the similarity score above the predetermined threshold to a recommendation database 316.

A similar user content extraction module 320 also receives the indication that the particular user has logged-on. Once logged-on, the similar user content extraction module 320 obtains a set of similar users from a user similarity database 322, which stores output from a similar user analyzer 324. The similar user analyzer 324 intermittently compares the particular user to account holders to identify which account holders are similar to the particular user based on user parameters stored in the user parameter database 120. In various implementations, the set of similar users is determined from account holders with a viewing history of content items. In this way, if the particular user does not have a viewing history of content items, the particular user can still be compared to those users with a viewing history in order to determine which users the particular user is most similar to based on user parameters (as described above, parameters include portfolio structure, trading activity, platform usage, and demographic information).

Once the similar user content extraction module 320 obtains the set of similar users for the particular user, the similar user content extraction module 320 retrieves the viewing history for each user in the set of similar users from the viewing history database 304. The similar user content extraction module 320 forwards the viewing history of the set of similar users to the recommendation database 316. The recommendation database 316 stores the identifiers of the content items that are similar to the particular user's viewing history as well as the viewing history of the set of particular users. In various implementations, the similar user content extraction module 320 also compares the viewing history of the set of similar users to content items, identifying those content items with a similarity score above the predetermined threshold, as described above.

A similarity index module 328 obtains a recommendation list from the recommendation database 316 that includes the identifiers of the content items for the particular user as well as the particular user's viewing history. The similarity index module 328 provides an indication of how similar content items included in the recommendation list are to the content items included in the particular user's viewing history. In various implementations, the similarity index module 328 is weighted exponentially in time, more heavily weighing the content items in the particular user's viewing history that have been more recently viewed—for example, those content items that have been viewed within the last month. If the particular user does not have a viewing history, the similarity index module 328 may score each content item in the recommendation list based on a viewing history of a most similar user.

A content filter 332 filters out content items in the recommendation list that are too similar according to the similarity index module 328. The content filter 332 may only excludes content items that are too similar when the particular user has a viewing history. In this way, the content filter 332 prevents the particular user from being recommended content items that are too similar to content items that the particular user has already viewed. Similarly, the content filter 332 may exclude content items on the recommendation list of the particular user that are too dissimilar. Additionally, the content filter 332 selects a set of content items from the recommendation list. The set of content items may be limited to a predetermined number, such as only selecting three content items to include in the set of content items. In various implementations, the content filter 332 may filter out content items in the recommendation list that are not approved for a present jurisdiction of the particular user. The present jurisdiction of the particular user may be included in the user parameter database 120.

The set of content items is limited so that the recommendation generation module 112 only sends a certain number of links for recommended content items to be displayed on a home screen of the particular user's account. In various implementations, based on the set of content items, the recommendation generation module 112 may produce content item metadata for content items in the set of content items (for example, title, publish date, clickable URL, etc.). The content item metadata may be used to display thumbnails in a web portal, as depicted in FIG. 2.

The set of content items is a list of identifiers that identify which content items should be displayed on the home screen via web portal. Once identified, the recommendation generation module 112 may generate user-selectable links that include the content item identifier identifying the content item stored in the content database 116 so that the content item is displayed to the particular user via the web portal.

Although shown as separate for functional purposes, data described above with respect to multiple databases may all be stored in a single database. For example, the viewing history database 304, the user similarity database 322, and the recommendation database 316 may all be implemented using a single data store, such as a relational database, a column store, etc. in various implementations, data from the user parameter database 120 may also be incorporated with one or more of the viewing history database 304, the user similarity database 322, and the recommendation database 316.

In implementations where the content database 116 stores videos, the file sizes of the videos may make incorporating the content of the content database 116 with data of other databases cumbersome. In various implementations, the content database 116 may store content items in a third party block store, such as the Amazon Simple Storage Service (S3) from Amazon Web Services.

Figure 4:
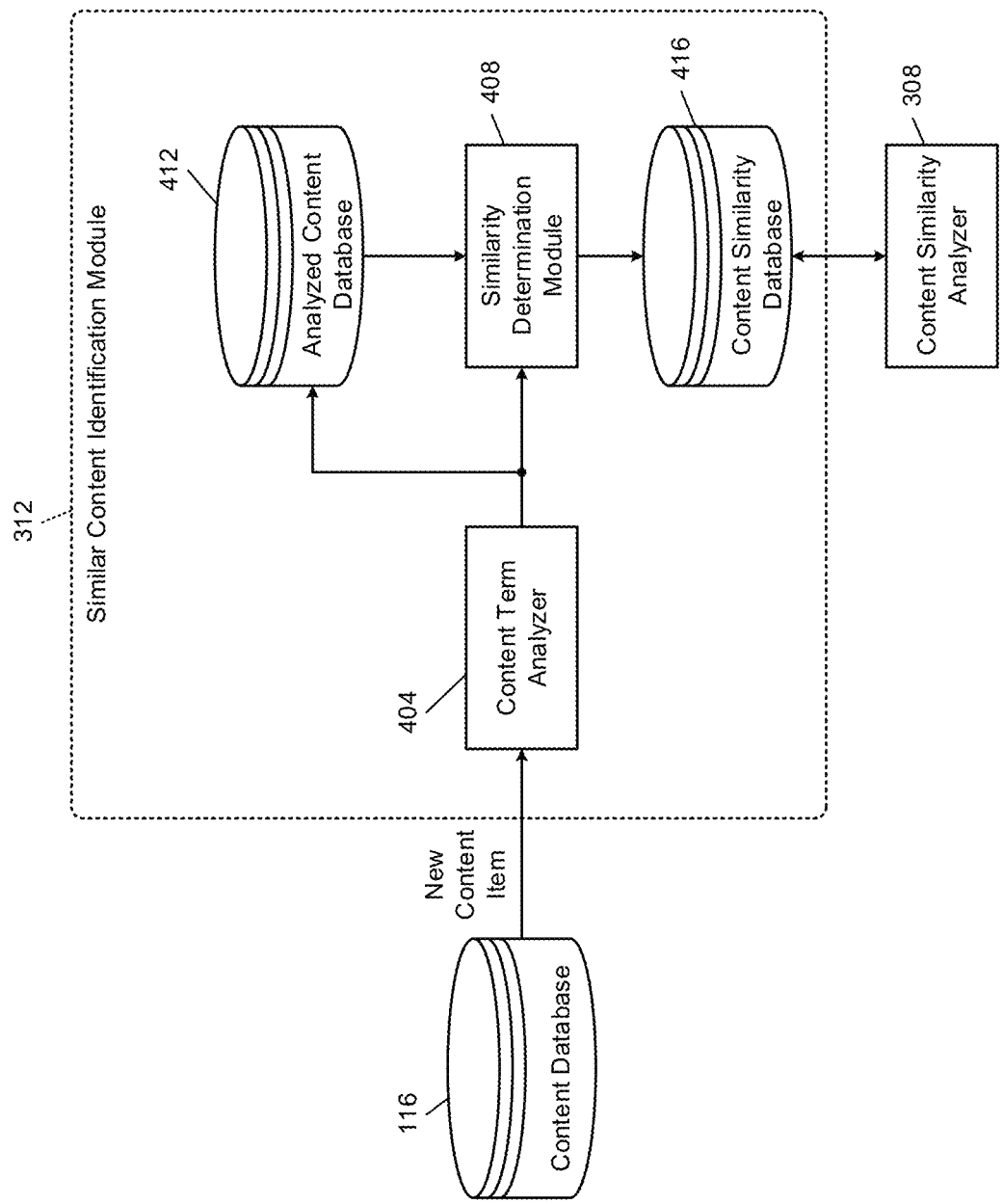
FIG. 4 is a functional block diagram of an example similar content identification module.

FIG. 4 is a functional block diagram of an example similar content identification module 312 according to principles of the present disclosure. As described above, the similar content identification module 312 obtains new content items from the content database 116 once the new content item has been uploaded. In various implementations, new content items may be uploaded by an administrator via an administration device, such as a computing device. Additionally, in certain implementations, users may upload content to the content database 116 based on user permissions.

A content term analyzer 404 obtains the new content item and identifies salient terms in the content item. For example, salient terms may include "options trading," "fed rate," or "IRA." As previously described, content items may be of multiple types, including an article, a video, of course, etc. The content term analyzer 404 is able to identify salient terms across different content types as stored oral content types, such as videos, include close captioning. In this way, the similar content identification module 312 is able to determine similarities across content types. The content types may include videos, article, courses, live courses, a playlist of a series of videos, etc.

In various implementations, the salient terms may be weighted according to importance. The content term analyzer 404 identifies the inherent structure of words to determine word frequency, co-frequency, and larger combinations of important keywords.

A similarity determination module 408 obtains the analyzed new content item and compares the analyzed new content item to previously analyzed content items stored in an analyzed content database 412. The analyzed content database 412 obtains the analyzed new content item from the content term analyzer 404 for storage. In various implementations, the similarity determination module 408 implements a machine learning algorithm to calculate a similarity matrix resulting in a similarity score between the new content item and each of the previously analyzed content items. In various implementations, matrix factorization techniques may be used to determine a content similarity value by comparing latent terms contained in stored content items.

The similarity determination module 408 may output, for each previously analyzed content item, a similarity score corresponding to the new content item. A content similarity database 416 may store the similarity scores. In various implementations, the content similarity database 416 may include a lookup table that stores similarity scores across stored content items.

In various implementations, the data from one or both of the analyzed content database 412 and the content similarity database 416 may be included in a single data store along with the content database 116, the user parameter database 120, the viewing history database 304, the recommendation database 316, and/or the user similarity database 322.

Figure 5:
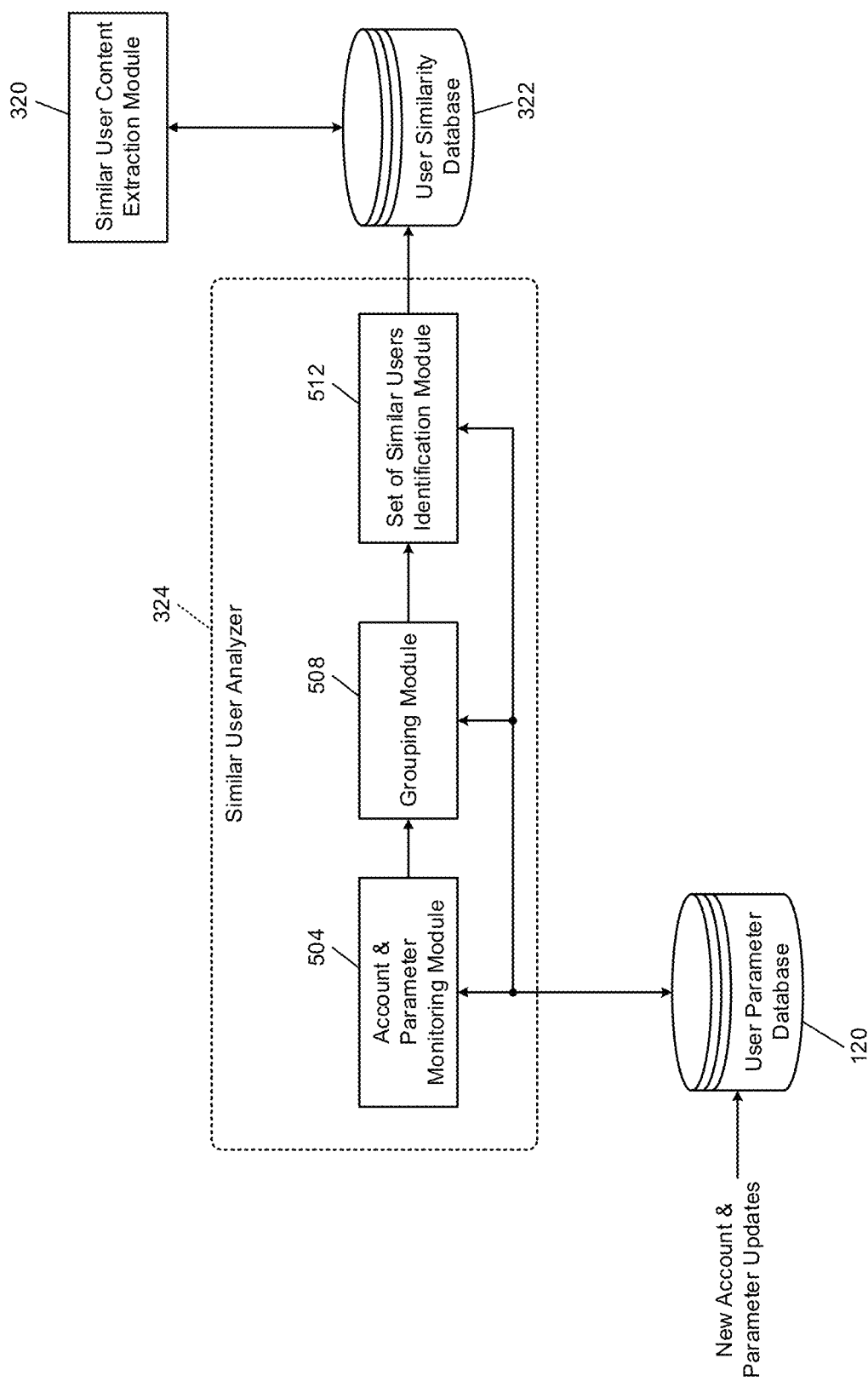
FIG. 5 is a functional block diagram of an example similar user analyzer.

FIG. 5 is a functional block diagram of an example similar user analyzer 324 according to principles of the present disclosure. As described previously, the similar user analyzer 324 identifies a set of similar users for the particular user as well as for every user with an account. The similar user analyzer 324 obtains user parameters for the particular user from the user parameter database 120. In various implementations, the similar user analyzer 324 identifies a set of similar users for a new user in response to a new account being generated for the new user.

Additionally, the similar user analyzer 324 may periodically update the set of similar users for account holders—for example, every week. The similar user analyzer 324 may also update the set of similar users for the particular user in response to one of the particular user's user parameters being notably adjusted. For example, if the particular user significantly increases stock trading or an amount of money included in an account (such as doubling their account total), the similar user analyzer 324 may be prompted to update the set of similar users as the particular user may be more similar to a different set of users.

An account parameter monitoring module 504 monitors the user parameter database 120 to determine when new accounts have been created and when parameters have been updated. The account parameter monitoring module 504 instructs the identification of a set of similar users in response to the new account being generated as well as in response to a notable alteration in one or more parameters of the particular user. As described previously, the account and parameter monitoring module 504 may also instruct the updating of the set of similar users for account holders at predetermined intervals, storing for each user when their similar users were last identified.

Once instructed to identify a set of similar users, a grouping module 508 obtains user parameters from the user parameter database 120 for the particular user and classifies the particular user into a group. The grouping module 508 may classify the particular user into a group of the set of groups based on user parameters from the user parameter database 120 of account holders. As described above, in various implementations, the grouping module 508 may use K-means clustering or a classification machine learning algorithm to classify the particular user into a group of the set of groups. In various implementations, the set of groups may be determined based on user parameters and group size limits. Additionally, the set of groups may be segregated based on portfolio size, user age, or a combination of the user parameters listed previously.

A set of similar users identification module 512 receives user parameters of the particular user and the particular user's group from the grouping module 508. From the users included in the group, the set of similar users identification module 512 determines how similar each user in the group is to the particular user. For example, a machine learning algorithm may be implemented to identify a distance metric indicating how similar each user in the group is to the particular user. The set of similar users identification module 512 then selects three to four users that are most similar or closest to the particular user. The set of similar users identification module 512 sends the set of similar users to the user similarity database 322 for storage. Then, as described with respect FIG. 3, when the particular user logs-in to their account, the similar user content extraction module 320 obtains the set of similar users from the user similarity database 322 and then obtains viewing histories for each user in the set of similar users for recommendation to the particular user.

Figure 6:
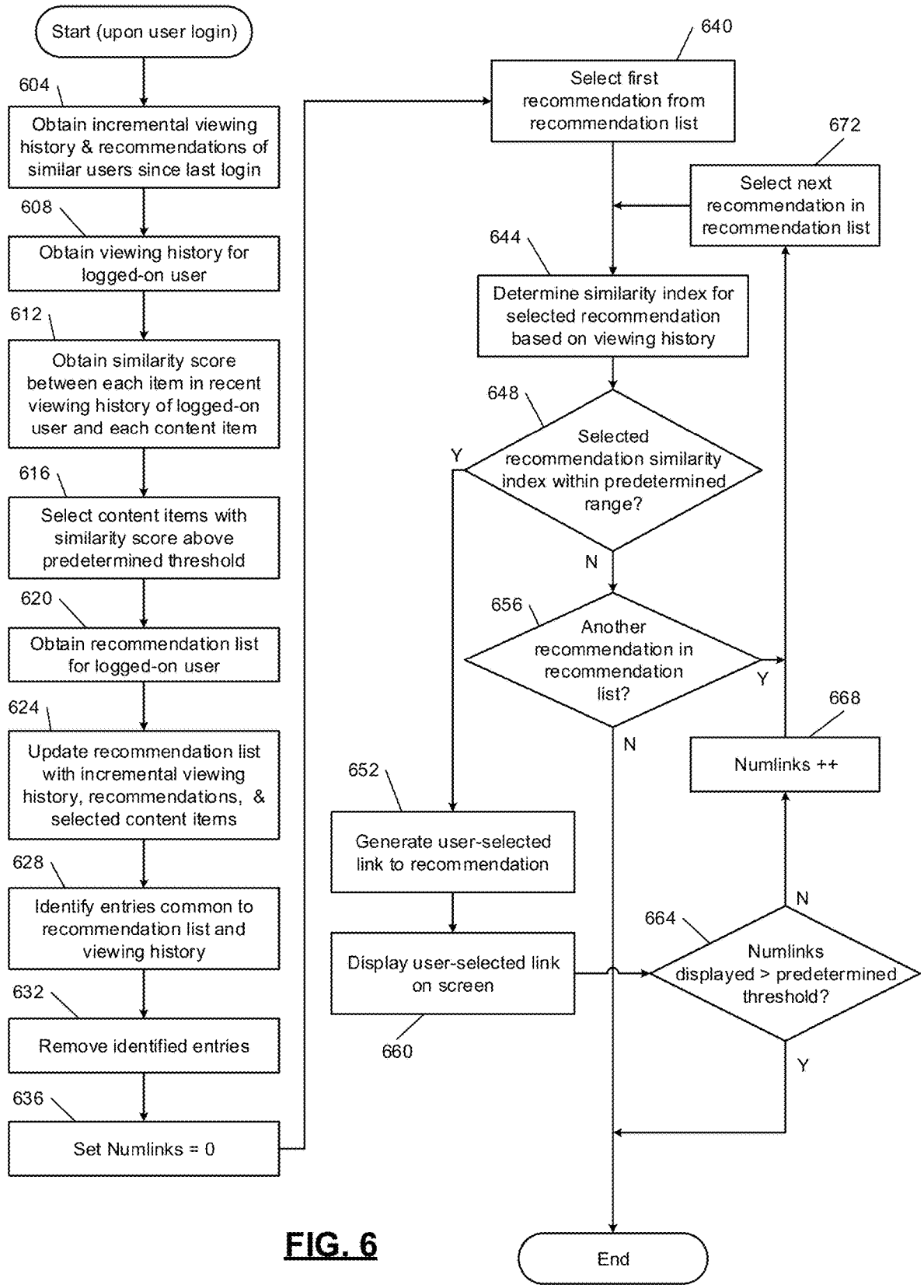
FIG. 6 is a flowchart depicting example operation of identifying content items for recommendation.

FIG. 6 is a flowchart depicting example recommending of content items within a content recommendation system according to the principles of the present disclosure. Control begins upon user login. At 604, control obtains incremental viewing histories and recommendations of similar users since the last user login. While FIG. 6 depicts and describes a single process of obtaining both viewing histories and recommendations of similar users, two separate processes may be implemented, a first process to obtain viewing histories and recommendations for the current user and a second process to obtain viewing histories and recommendations of similar users. The first and second process would each result in content to recommend to the logged-on users who have previously consumed content, while first time users would receive recommendations from only the second process. At 608, control obtains viewing history for the logged-on user. Control continues to 612 to obtain a similarity score between each content item included in a recent viewing history of the logged-on user and each stored content item available for viewing.

At 616, control selects obtained content items with a similarity score above a predetermined threshold. By comparing the obtained content items to the viewing history of the logged on user and selecting the most similar content items, control is excluding those content items that may not be particularly relevant to the logged-on user. In various implementations, such as when the logged-on user does not have a viewing history, control does not identify similar content items from stored content items.

Control continues to 620 to obtain a recommendation list for the logged on user. At 624, control updates the recommendation list with the incremental viewing history, recommendations, and the selected content items. At 628, control identifies entries common to the recommendation list and viewing history of the logged-on user. Control proceeds to 632 to remove the identified entries so that the logged-on user is not recommended content items that have already been viewed. At 636, a number of links count is set to zero.

Control proceeds to 640, where a first recommendation is selected from the recommendation list. At 644, control determines a similarity index for the selected recommendation based on the viewing history of the logged-on user. As described previously, if the logged on user does not have a viewing history, a similarity index is not determined. In various implementations, the similarity index may be weighted exponentially in time to favor viewing history entries of the logged on user that have been viewed more recently.

At 648, control determines if the similarity index of the selected recommendation is within a predetermined range. The predetermined range is selected to exclude a recommendation that is too similar to the logged-on user's viewing history. The predetermined range may also be used to exclude recommendations that are too dissimilar to the logged-on user's viewing history. If yes, control continues to 652 to generate a user-selectable link that directs the logged-on user, upon selection, to the content item associated with the recommendation. Otherwise, control continues to 656 where control determines if another recommendation is in the recommendation list.

Returning to 652, once the user-selectable link is generated, control continues to 660 to display the user-selectable link on a screen. Control then proceeds to 664 to determine if the number of links presently displayed on the screen is greater than a predetermined threshold. For example, the screen may have a limited display area, therefore only a certain number of user-selectable links should be displayed. Additionally, even with scrolling capabilities, control may only generate a certain number of user-selectable links to only recommend a certain number of content items. If at 664, the number of links displayed on the screen is greater than the predetermined threshold, control ends. Otherwise control proceeds to 668 to increment the number of links displayed and continues to 672 to select the next recommendation included in the recommendation list. Returning to 656, if another recommendation is included in the recommendation list, control proceeds to 672 to select the next recommendation. However, if at 656 control determines that the recommendation list is empty, control ends.

Figure 7:
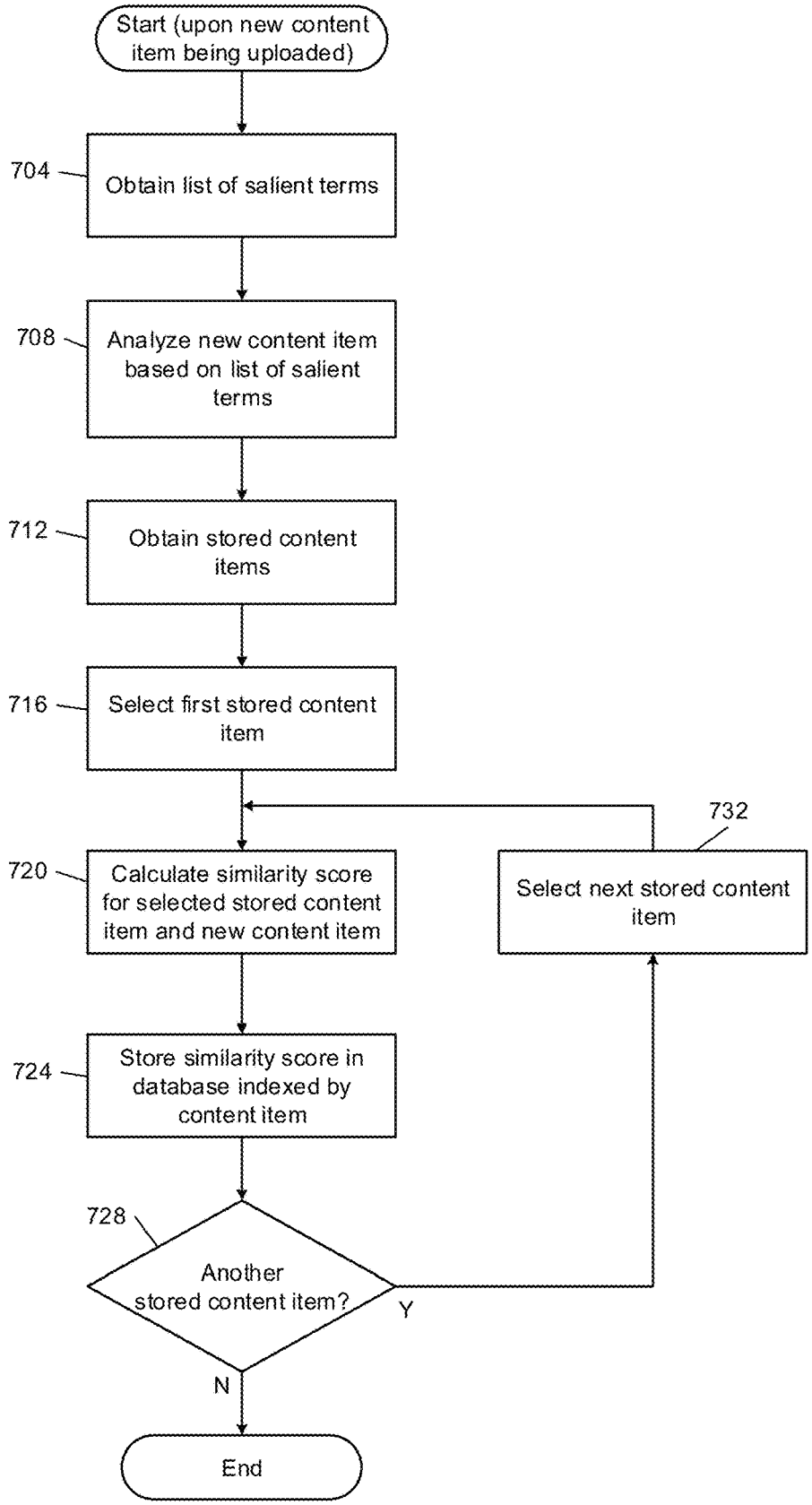
FIG. 7 is a flowchart depicting example operation of new content item analysis.

FIG. 7 is a flowchart depicting example analyzing of a new content item within a content recommendation system according to the principles of the present disclosure. Control begins upon a new content item being uploaded. At 704, control obtains a list of salient terms. At 708, control analyzes a new content item based on the list of salient terms. At 712, control obtains previously analyzed content items from storage. In various implementations, control uses a machine learning algorithm trained with the list of salient terms to analyze all terms included in a new content item and identify which of the previously analyzed content items are most similar to the new content item by calculating a similarity score. At 716, control selects a first stored content item. Control proceeds to 720 to calculate a similarity score for the selected stored content item and the new content item. At 724, control stores the similarity score in a database indexed by content item. Control proceeds to 728 to determine if another content item is stored. If yes, control proceeds to 732 to select the next stored content item and calculate a similarity score between the next stored content item and the new content item. Otherwise, control ends.

Figure 8:
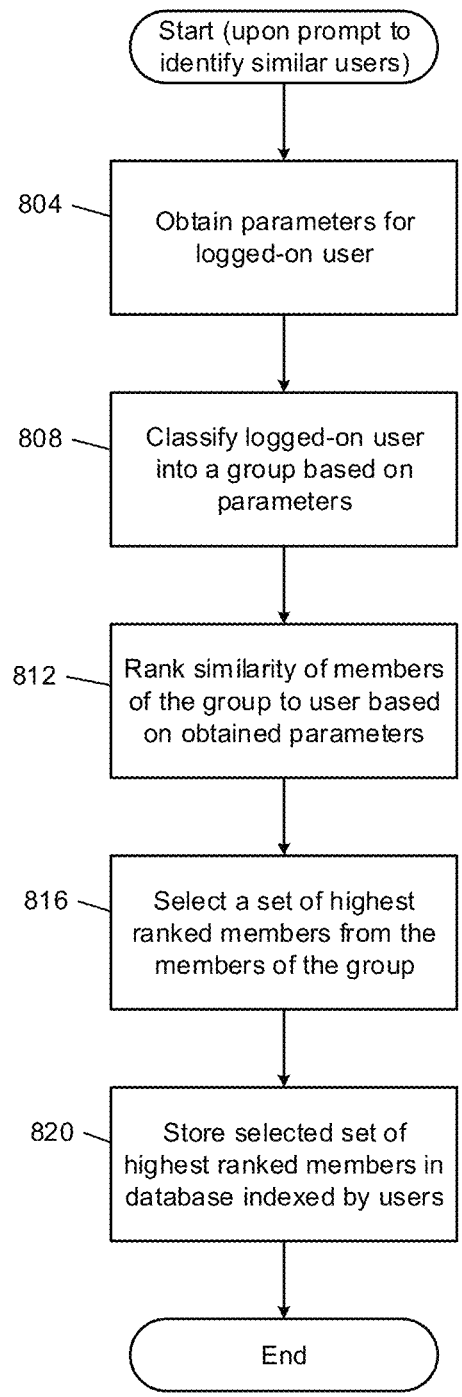
FIG. 8 is a flowchart depicting example operation of identifying similar users.

FIG. 8 is a flowchart depicting example identifying users similar to a logged-on user within a content recommendation system according to the principles of the present disclosure. Control begins upon a prompt to identify similar users, such as a new account being created, a predetermined interval elapsing, a notable account parameter change, etc. At 804, control obtains parameters for the logged-on user. At 808, control classifies the logged-on user into a group based on user parameters. As described previously, each group that the logged-on user may be classified into is segregated based on user parameters or a subset of user parameters, such as age, account size, etc. Control continues to 812 to rank a similarity of members of the group to the logged-on user based on the obtained parameters for the logged on user.

As described previously, a machine learning algorithm may be implemented to identify or calculate a distance metric between each member of the group and the logged on user. The distance metric may indicate how similar a user is to each member of the group. At 816, control selects a set of highest ranked members from the members of the group. For example, when determining a distance metric, control may select three or four members within the group with the closest distance metric to logged-on user. At 820, control stores the selected set of highest ranked members in a database indexed by user. The database may be accessed upon a user logging-on to identify the present set of similar users of the logged-on user to obtain the most updated viewing history and recommendation history of the set of similar users. Then, control ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WWI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A recommendation system comprising:
    a content similarity analyzer configured to:
        determine a first set of content item identifiers similar to a set of viewed content items of a first user identifier based on respective similarity scores; and
        add the first set of content item identifiers to a first list corresponding to the first user identifier;
    a similar user content extraction module configured to:
        identify, based on the first user identifier, a set of similar user identifiers from a user similarity database;
        obtain, based on respective viewing histories of the set of similar user identifiers, a second set of content item identifiers; and
        add the second set of content item identifiers to the first list; and
    a content filter configured to:
        select a subset of content item identifiers from the first list based on the corresponding similarity scores between content item identifiers of the first list and a viewing history associated with the first user identifier; and
        transmit the subset of content item identifiers for display of the corresponding content items via a web portal on a user interface of a first user device.

2. The recommendation system of claim 1 further comprising a similar content identification module configured to generate a set of similarity scores for a first content item by comparing the first content item to a set of content items stored in a content database.

3. The recommendation system of claim 2 wherein the first content item is compared to the set of content items in response to the first content item being uploaded to the content database.

4. The recommendation system of claim 2 wherein the set of similarity scores includes a similarity score comparing the first content item and each content item of the set of content items.

5. The recommendation system of claim 1 wherein the first list is stored in a recommendation database.

6. The recommendation system of claim 1 wherein the content filter is configured to exclude content item identifiers from the subset of content item identifiers in response to content item identifiers of the first list matching a previously viewed content item identifier included in the viewing history associated with the first user identifier.

7. The recommendation system of claim 1 further comprising:
a similar user database storing user parameters for a plurality of users; and
a similar user analyzer configured to categorize the plurality of users into a set of groups based on the corresponding user parameters stored in the similar user database and store the set of groups in the user similarity database.

8. The recommendation system of claim 7 wherein the user parameters of the similar user database include (i) portfolio structure, (ii) trading activity, (iii) platform usage, and (iv) demographic information.

9. The recommendation system of claim 7 wherein the similar user content extraction module is configured to identify the set of similar user identifiers by selecting the set of similar user identifiers from a first group of the set of groups in response to the first user identifier being categorized in the first group.

10. The recommendation system of claim 9 wherein the similar user content extraction module is configured to select a threshold number of identifiers as the set of similar user identifiers.

11. A recommendation method comprising:
determining a first set of content item identifiers similar to a set of viewed content items of a first user identifier based on respective similarity scores;
adding the first set of content item identifiers to a first list corresponding to the first user identifier;
identifying, based on the first user identifier, a set of similar user identifiers from a user similarity database;
obtaining, based on respective viewing histories of the set of similar user identifiers, a second set of content item identifiers;
adding the second set of content item identifiers to the first list;
selecting a subset of content item identifiers from the first list based on the corresponding similarity scores between content item identifiers of the first list and a viewing history associated with the first user identifier; and
transmitting the subset of content item identifiers for display of the corresponding content items on a user interface of a first user device.

12. The recommendation method of claim 11 further comprising generating a set of similarity scores for a first content item by comparing the first content item to a set of content items stored in a content database.

13. The recommendation method of claim 12 further comprising comparing the first content item to the set of content items in response to the first content item being uploaded to the content database.

14. The recommendation method of claim 12 wherein the set of similarity scores include a similarity score comparing the first content item and each content item of the set of content items.

15. The recommendation method of claim 11 wherein the first list is stored in a recommendation database.

16. The recommendation method of claim 11 further comprising excluding content item identifiers from the subset of content item identifiers in response to content item identifiers of the first list matching a previously viewed content item identifier included in the viewing history associated with the first user identifier.

17. The recommendation method of claim 11 further comprising:
categorizing a plurality of users into a set of groups based on corresponding user parameters, wherein a similar user database stores user parameters for the plurality of users; and
storing the set of groups in the user similarity database.

18. The recommendation method of claim 17 wherein identifying the set of similar user identifiers includes selecting the set of similar user identifiers from a first group of the set of groups in response to the first user identifier being categorized in the first group.

19. The recommendation method of claim 18 further comprising selecting a threshold number of identifiers as the set of similar user identifiers.

20. A non-transitory computer-readable medium storing processor-executable instructions, the instructions comprising:
determining a first set of content item identifiers similar to a set of viewed content items of a first user identifier based on respective similarity scores;
adding the first set of content item identifiers to a first list corresponding to the first user identifier;
identifying, based on the first user identifier, a set of similar user identifiers from a user similarity database;
obtaining, based on respective viewing histories of the set of similar user identifiers, a second set of content item identifiers;
adding the second set of content item identifiers to the first list;
selecting a subset of content item identifiers from the first list based on the corresponding similarity scores between content item identifiers of the first list and a viewing history associated with the first user identifier; and
transmitting the subset of content item identifiers for display of the corresponding content items on a user interface of a first user device.

\* \* \* \* \*